Patented July 15, 1952

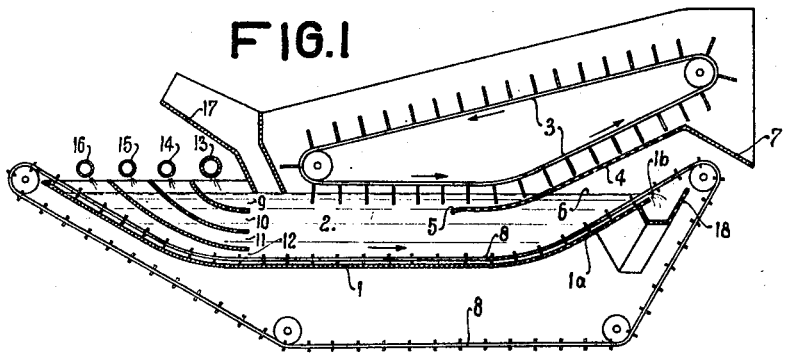
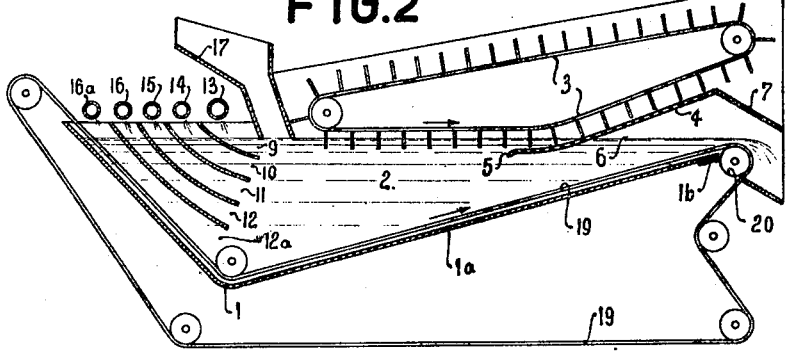
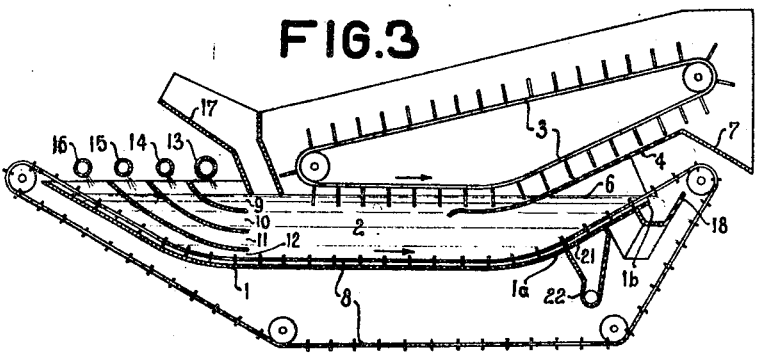

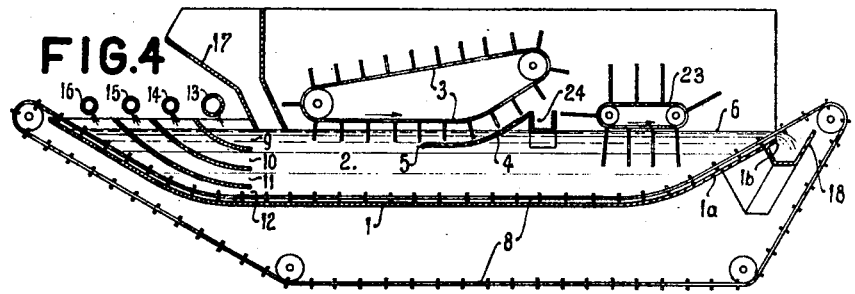
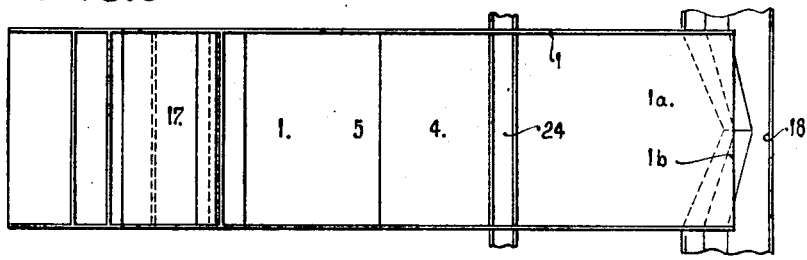
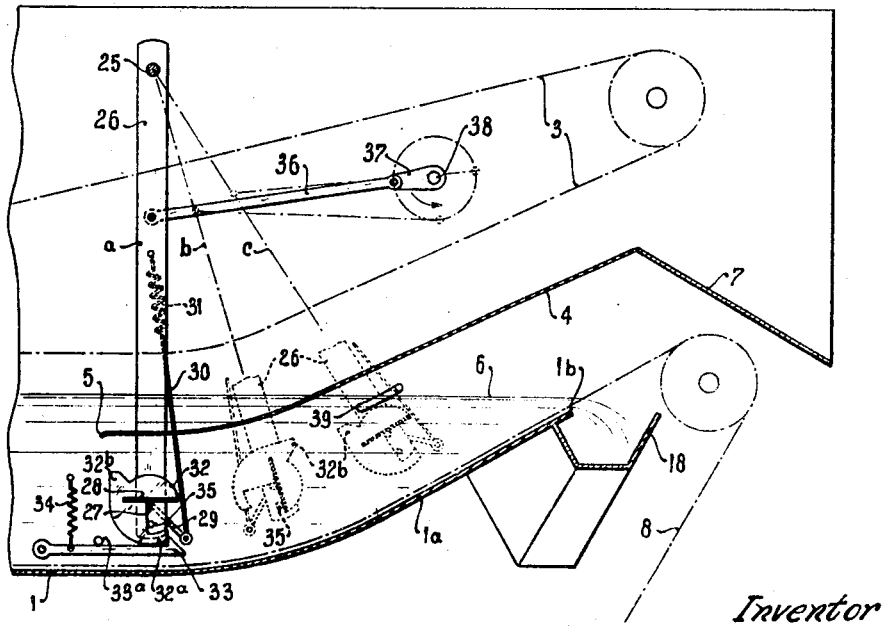

2,603,352

UNITED STATES PATENT OFFICE 2,603,352

APPARATUS FOR SEPARATING SOLID GRANULAR MATERIALS OF DIFFERENT SPECIFIC GRAVITIES

Klaas F. Tromp, Kerkrade, Netherlands

Application June 11, 1947, Serial No. 753,988

4 Claims. (Cl. 209—173)

This invention relates to the separation of solid granular materials of different specific gravities by means of liquid mediae of such character that the less dense material is caused to float while the denser material sinks, such as in the liquid separation of shales and the like impurities from coal, and of minerals from rock or gangue in ore dressing.

Such separation is usually effected by means of a tank containing the liquid medium and provided with means for separately discharging the floating and the sinking products, and occasionally also the middlings. The liquid medium may be an organic liquid, or a chemical solution, or a stable or semi-stable suspension, the latter being made up, say by mixing various finely divided solids with water to give a specific gravity according to the materials to be separated.

It is generally recognized that it is essential in such separation to eliminate eddies in the liquid medium used, in order that the separation may be controlled exclusively by the specific gravities, and not by the shapes and the sizes of the grains. In practice, however, it is impossible for said medium to be kept entirely quiescent, since the removal of the products from the bath necessarily entails movement of the liquid. In addition thereto, particles having the same specific gravity as the liquid medium tend to gradually accumulate in the bath, and if these particles are not continuously removed, their accumulation will unfavorably affect the settling of the sinks especially if the bath is not constituted as a homogeneous liquid, but as a suspension.

Since, as stated, it is impossible to entirely avoid movements in the bath, it is of the utmost importance for said movements to be minimized and of a character such as not to affect the gravity separation to any appreciable extent. As the separation should be controlled by gravity only, i. e. be performed by vertical forces, it will be appreciated that with a horizontal flow of the liquid through the full width of the tank the interference with the separation will be minimum.

The floats can be floated off with a surface stream, but this has the inconvenience that the vertical distance between the surface of the bath and the weir has to have a value at least equal to the maximum size of the grains under treatment. If the material to be treated contains grains up to say 150 mm., said distance would have to exceed 150 mm., and this means that a volume of liquid of $a \times 500$ cb. m ($a$=width of tank in m) would be required per hour. Abstracting from the great amount of energy necessary for circulating this large volume and from the capital cost and size of the installation required for sieving said liquid, the corresponding velocity of 90 cm./sec. of said surface stream would very badly impair the closeness of the separation.

If, however, the floats are removed mechanically by a slow moving flight conveyor (which term is intended to include a rake, a rotary paddle or the like), the velocity of the surface stream can very well be held under control. With means of said type, both a large capacity and a close separation can be secured.

As already stated, it is also necessary, with a view to the desired closeness of separation, to flow off the suspended material by a horizontal stream extending through the full width of the bath. This implies that said stream, which moves in the same direction as the flight conveyor for removing the floats, should flow unimpaired below the surface stream. Consequently, it is necessary for the floats to move onto and over a chute having its front edge submerged in the bath and thence slightly sloping upward towards the rear, but this creates the danger that, owing to the presence of any upwardly directed streams or eddies, a certain amount of floats will move past the front edge of the chute beneath the bottom face thereof.

It has now been found that injurious eddies are set up mainly owing to the fact that the flight conveyor does not always displace exactly the same amount of liquid as is being introduced, on the same level, at the feed end of the tank. Should the flight conveyor draw a larger volume of liquid than is being introduced, the excess of said volume will necessarily have to be supplemented by currents rising from below, whereby sinks are likely to mix with the floats. Conversely, if the volume of liquid drawn by the flight conveyor is smaller than the one introduced on the same level, the excess of the latter will have to flow underneath said conveyor, thus having a tendency to carry away part of the floats, which, consequently, move beneath the bottom side of the chute towards the rear end of the tank. In this connection it is to be remarked that the volume of liquid drawn by the flight conveyor varies in dependency of the amount of floats engaged by said conveyor.

With a view to overcoming the said inconvenience, means could be provided for keeping the load of the tank practically constant, but such means would necessarily have to comprise a comparatively big feed hopper. However, this hopper and the conveyors and dosing apparatus required to cooperate therewith, appreciably increase the capital cost, and the trituration to which the material in the hopper is subjected may cause serious losses.

Now, in accordance with the invention, in washing apparatus comprising, in addition to mechanical means for removing the floats, means at the feed end for introducing liquid through the full width of the tank and an overflow weir for liquid, the setting up of eddies in the bath is avoided by the provision of means whereby the sinks are discharged over said weir. With this arrangement, the level of the bath will rise or sink in dependency of the amount of settings in the tank, and since the amount of settings will ordinarily be proportionate to the load, it will be understood that increased load will cause the liquid level to rise. Owing thereto, the flight conveyor will draw a uniform amount of liquid, as the volume of liquid displaced by the floats will be compensated by the rise of the level, and this will cause the flight conveyor to draw an increased amount of liquid.

In order that my invention may be well understood by those skilled in the art, reference is had to the accompanying, diagrammatic drawing, wherein Figs. 1–4 are longitudinal sectional elevations of four different embodiments, Fig. 5 is a top plan view of the apparatus shown in Fig. 4, and Fig. 6 is a longitudinal, sectional view on an enlarged scale of the rear portion of a fifth embodiment. Throughout the drawing, like references denote similar parts.

The apparatus shown in Fig. 1 comprises, in addition to a relatively shallow tank 1 having parallel, vertical side walls and filled with a liquid medium 2 as referred to above, a flight conveyor 3 having part of its bottom run submerged and being adapted to be driven in counter-clockwise direction so as to rake floats onto and over a perforated, upwardly inclined chute 4, the lower end 5 of which extends downwardly to a relatively small distance below the surface 6 of the liquid bath. As shown, said chute merges, above said surface, into a downwardly sloping section 7 extending beyond the rear end of the tank. A drag conveyor 8 driven in clockwise direction and extending through the full length of the tank is mounted with its upper part in the lower portion thereof so as to be adapted to sweep the flat tank bottom and to drag the settings towards and over the upwardly sloping rear end 1a of said bottom.

The front or feed side of the tank is provided with four vertically spaced openings 9, 10, 11, 12 extending through the full width of the tank end serving as inlets for liquid medium fed thereto by conduits 13, 14, 15 and 16, respectively, the materials to be separated being charged into the tank by a chute 17 opening vertically above said inlet openings and substantially at the surface of the bath.

The surface 6 of the bath is kept at a level somewhat higher than that of the top edge 1b of the upwardly sloping rear portion 1a of the tank bottom, said edge thus forming a weir for the simultaneous discharge of liquid and settlings into a transverse, sloping trough 18.

The ratio between the speeds of the conveyors 3 and 8 should be substantially equal to that between the volumes of floats and sinks, respectively, in the material to be separated. The amount of liquid fed per second into the tank through the top inlet 9 should be equal to the amount of liquid that would be drawn by the flight conveyor 3 if there were no floats.

The drag conveyor 8 comprises two chains laterally spaced apart a distance substantially equal to the width of the tank and interconnected by scrapers of reduced height and also suitably spaced, so that the sinks, when reaching the top edge 1b, can easily be discharged through the openings between the scrapers.

The flight conveyor 3 is of a similar construction as drag conveyor 8, but its scrapers have a relatively great height.

As to the rear portion 1a of the tank bottom, this should have a slope such that the settlings dragged by conveyor 8 are adapted to be carried uphill without sliding back, i. e. so as to be discharged over the weir 1b as a close layer.

The apparatus illustrated in Fig. 2 differs from that shown in Fig. 1 mainly in that the settlings are removed from the tank 1 by a drag conveyor constituted as an imperforate belt 19, the degree of friction of whose surface may be increased, if necessary, as by indenting, or by ribs of reduced height, and further, in that the driving roller 20 of this belt is located entirely below the surface 6 of the bath, so as to virtually form the weir. The gap between roller 20 and edge should be sealed. Owing to the roller 20 being submerged, the liquid will flow in the same direction as the settlings on the belt up to a point beyond that where the settlings are discharged. This is of special advantage if the belt has a smooth surface, as said flow effectively prevents the settlings from sliding back. Thus, no accumulation of settlings can take place and, as a consequence, no sinks can mix with the floats. Moreover, since no back-sliding of the settlings can occur, said liquid flow over the belt allows of the speed of the belt to be somewhat increased, which, in turn, favorably affects the capacity of the apparatus.

As already stated hereinbefore, it is essential to prevent the liquid flowing directly below the scrapers of the horizontal bottom run of conveyor 3 and below the perforated chute 4 from carrying away floats. However, the liquid fed into the tank has a tendency to flow upward, which tendency, with the use of a suspension, is increased by the "sand" settling progressively in the direction of flow. Therefore, in order that the velocity of the said flow may be kept at the required value, it is desirable for the tank to be provided at its discharge end with means for controlling said flow, in addition to the described means whereby it is ensured that said conveyor at any moment draws the same volume of liquid as is being introduced through the inlet opening 9. Said control means may comprise, in known manner, a sieve 21 and a discharge chute 22 vertically below the same, see Fig. 3, which, otherwise, is identical with Fig. 1. Said sieve extends through the full width of the tank 1, forms part of the upwardly inclined bottom portion 1a and is located on a level intermediate the surface of the bath and the horizontal portion of the bottom.

In accordance with Figs. 4 and 5, the apparatus is provided with a second, horizontal flight conveyor 23 disposed beyond conveyor 3 and having for its duty to control the flow of liquid directly below the chute 4. In this apparatus, chute 4 is not perforated and does not extend beyond the weir 1b, as is the case in Figs. 1–3, but only up to a transverse, inclined chute 24, which is located about mid-way the feed end of the tank and the weir 1b and serves for discharging the floats and the liquid removed from the bath by conveyor 3. This embodiment has the advantage of doing away with the sieve 21 illustrated in Fig. 3, so that it is also suitable for the preparation of fine materials.

Fig. 6 illustrates still another device for controlling the flow immediately below the perforated chute 4 in apparatus substantially in accordance with Fig. 1. This device comprises a rotatable, horizontal shaft 25 extending across the tank and located an appreciable vertical distance above the front edge 5 of the perforated chute 4. Secured to either end of said shaft is an arm 26, which, when depending vertically, extends to a small distance from the rear end of the horizontal portion of the tank bottom and just clears the adjacent side wall of the tank.

Near their lower ends, said arms are interconnected by a horizontal shaft 27 supported in bearings thereof, and secured to said shaft is an impeller blade 28 also extending through substantially the full width of the tank. At either end, the shaft 27 has secured thereto a crank arm 29 hinged to which is a rod 30 engaged by one end of a coiled spring 31, the other end of which is connected to arm 26. Also secured to either end of shaft 27 is a disk 32.

A pawl 33, loaded by a spring 34 and limited in its upward movement by an abutment 33a, is adapted to engage a cam 32a of disk 32.

Disk 32 with associate parts (28, 27, 29) is prevented from rotation relative to arm 26 by an abutment 35 of arm 26 and by the pull of spring 31 acting thereon through crank arm 29 when arm 26 assumes its vertical position as shown in full lines. In said position, the impeller blade 28 is horizontal.

Abutment 35 prevents the impeller from turning, relative to said arm, through an angular distance exceeding about 90°, in clockwise direction, starting from said horizontal position.

Intermediate its ends, each arm 26 is hinged to the connecting rod 36 of a crank 37 secured on a horizontal shaft 38 parallel to shaft 25 and driven in counter-clockwise direction by power means not shown. The arms 26 are thereby oscillated through an angle of less than 45° between the vertical position a shown in full lines and an inclined position c shown in dash lines, b being an intermediate position during the outward movement of the arms.

Secured to either side wall of the tank is an abutment 39 adapted to engage a cam 32b of the corresponding disk 32, when arms 26 have nearly reached their end position during their movement towards weir 1b.

The described control device operates as follows:

If arms 26, starting from position a, are swung in counter-clockwise direction towards weir 1b, disks 32 with associate parts (27, 28, 29) will rotate, against the pull of springs 31, in clockwise direction relative to said arms owing to the engagement of cams 32a by pawls 33. As a consequence, the angles between crank arms 29 and their rods 30 (one the right hand side of said arms) will gradually decrease to zero. A moment thereafter, i. e. when rods 30 enclose already very small angles with crank arms 29 on the left hand side thereof, cam 32a disengages pawl 33, whereby springs 31 impart a sudden further rotary movement in clockwise direction to the system 27, 28, 29, 32, whereby the blade 28 assumes a position parallel with the longitudinal axes of arms 26 and engages the abutments 35.

In this position of the system 27, 28, 29, 32 relative to the arms 26, cams 32b are located as to come into contact with the abutments 39 in the further swinging movement of the arms. Owing to these abutments, the disks 32 are rotated in counter-clockwise direction relative to the arms during the last part of the outward swinging movement thereof.

Just before the end of the outward stroke, the angles between the rods 30 and the crank arms 29 on the left hand side thereof have decreased to zero, so that a moment later the system 27, 28, 29, 32 is again urged by springs 31 into a position wherein the plane of blade 28 is at right angles to the axes of arms 26, which position is maintained during the full inward or return stroke of the arms 26.

It will thus be understood that the impeller blade 28 during the outward movement of arms 26 draws liquid towards the weir 1b, but during its return stroke cleaves the liquid without meeting with any appreciable resistance.

The control device just described, as compared to that shown in Fig. 4, has some marked advantages. In the first place, the drawing action of the impeller blade begins already right at the front edge 5 of the chute 4, thereby ensuring the desired control of the liquid through the full length of the separation zone, i. e. the zone between the feed end of the tank and said edge. Secondly, said device allows of the length of the tank to be reduced.

What I claim is:

1. Apparatus for the separation of solid granular materials having different densities by means of a liquid medium of such character that the less dense material is caused to float and the denser material is caused to settled in the liquid medium, comprising in combination a tank having a front end and a rear end and containing a bath of liquid medium, the bottom of said rear end being upwardly inclined so as to constitute the rear end wall of the tank, means for charging material to be separated into the bath at the front end of the tank, means for introducing liquid medium into the bath at different levels thereof and through substantially the full width of the tank at the front end thereof, a chute having its front edge slightly submerged in the bath intermediate the front and the rear end of the tank and upwardly inclined towards said rear end, a flight conveyor having a single run in the tank moving only toward the rear end of the tank and substantially flush with the top face of the said chute, a weir at the rear end of the tank and having its top surface below the surface of said bath, and a drag conveyor having a single run in the tank moving from the front end toward the rear end of the tank and substantially flush with the tank bottom up to said overflow weir so as to be adapted to discharge the suspension and settlings together over said weir, said settlings remaining submerged in said suspension during the travel over said weir.

2. Apparatus as claimed in claim 1, wherein the said upwardly inclined bottom portion of the tank is perforated substantially midway between its lower end and the said weir.

3. Apparatus as claimed in claim 1, wherein the rear end of the chute is located a substantial distance in front of the weir, and wherein a second drag conveyor is provided having a substantially horizontal run intermediate the rear end of the chute and the weir, said run being immersed in the bath to a level below the front end of the chute.

4. Apparatus for the separation of solid granular materials having different densities by means of a liquid medium of such character that the less dense material is caused to float and the denser material is caused to settle in the liquid medium, comprising in combination a tank having a front end and a rear end and containing a bath of liquid medium, the bottom of said rear end being upwardly inclined so as to constitute the rear end wall of the tank, means for charging the material to be separated into the bath at the front end of the tank, means for introducing liquid medium into the bath at different levels thereof and through substantially the full width of the tank at the front end thereof, a chute having its front edge slightly submerged in the bath intermediate the front and rear end of the tank and upwardly inclined towards said rear end, a flight conveyor having a single run in the tank moving only toward the rear end of the tank and substantially flush with the top face of the said chute, a weir at the rear end of the tank and having its top surface below the surface of said bath to permit the overflow of liquid medium and settlings, a drag conveyor having a single run in the tank moving only towards the rear end of the tank and substantially flush with the tank bottom up to said overflow weir so as to be adapted to discharge settlings over said weir, a substantially flat impeller blade, means for longitudinally reciprocating said blade in the rear portion of the bath in the space behind the front edge of the chute, and means adapted to shift said blade from liquid impelling position during its rearward stroke to liquid cleaving position during its return stroke.

KLAAS F. TROMP.

REFERENCES CITED

The following references are of record in the file of this patent:

UNITED STATES PATENTS

| Number | Name | Date |
| --- | --- | --- |
| 2,139,047 | Tromp | Dec. 6, 1938 |
| 2,209,618 | Vogel | July 30, 1940 |
| 2,365,734 | Tromp | Dec. 26, 1944 |

FOREIGN PATENTS

| Number | Country | Date |
| --- | --- | --- |
| 886,332 | France | June 28, 1943 |
| 563,754 | Great Britain | Sept. 13, 1944 |